US012638042B2

(12) United States Patent  
Oger et al.

(10) Patent No.: US 12,638,042 B2  
(45) Date of Patent: May 26, 2026

(54) ROD FOR CONNECTING MEMBERS OF A MOTOR VEHICLE, AND ASSOCIATED MANUFACTURING METHOD

(71) Applicant: ContiTech Vibration Control GmbH, Hannover (DE)

(72) Inventors: Sébastien Oger, Pléchatel (FR); Franck Kerguelen, Treffendel (FR)

(73) Assignee: ContiTech Vibration Control GmbH, Hannover (DE)

( * ) Notice: Subject to any disclaimer, the term of this patent is extended or adjusted under 35 U.S.C. 154(b) by 233 days.

(21) Appl. No.: 18/260,941

(22) PCT Filed: Jan. 7, 2022

(86) PCT No.: PCT/EP2022/050232  
§ 371 (c)(1),  
(2) Date: Jul. 11, 2023

(87) PCT Pub. No.: WO2022/148826  
PCT Pub. Date: Jul. 14, 2022

(65) Prior Publication Data  
US 2024/0052877 A1      Feb. 15, 2024

(30) Foreign Application Priority Data  
Jan. 11, 2021     (FR) ..................................... 2100194

(51) Int. Cl.  
*F16C 7/02* (2006.01)  
*B29C 45/14* (2006.01)  
(Continued)

(52) U.S. Cl.  
CPC ........ *F16C 7/026* (2013.01); *B29C 45/14467* (2013.01); *B29C 45/14786* (2013.01); (Continued)

(58) Field of Classification Search  
CPC ........ F16C 7/02; F16C 7/026; F16C 2208/04; F16C 2208/20; F16C 2220/04; (Continued)

(56) References Cited

U.S. PATENT DOCUMENTS 3,056,167 A * 10/1962 Knoppel ............ B29D 99/0007  
425/111  
4,425,820 A      1/1984 Swozil  
(Continued)

FOREIGN PATENT DOCUMENTS

CN      106438667 A  *  2/2017  ................ F16C 7/04  
CN      113815376 A  *  12/2021  ......... B60G 21/0551  
(Continued)

OTHER PUBLICATIONS

Machine translation of CN 113815376 A obtained on Jun. 24, 2025.*

(Continued)

*Primary Examiner* — Adam D Rogers  
(74) *Attorney, Agent, or Firm* — REISING ETHINGTON, P.C.

(57) ABSTRACT

A connecting rod includes a connecting part to cooperate with an external member. The connecting part includes a yoke connected to an eyelet by a continuous reinforcing strip and forming a loop. The yoke, eyelet and reinforcing strip being overmolded.

11 Claims, 4 Drawing Sheets

(51) Int. Cl.
    *B29L 31/06*         (2006.01)
    *B60G 7/00*         (2006.01)

(52) U.S. Cl.
    CPC . *B29C 2045/14442* (2013.01); *B29L 2031/06*
        (2013.01); *B60G 7/001* (2013.01); *B60G*
        *2206/014* (2013.01); *B60G 2206/016*
        (2013.01); *B60G 2206/7104* (2013.01); *F16C*
        *2208/04* (2013.01); *F16C 2208/20* (2013.01);
        *F16C 2220/04* (2013.01)

(58) Field of Classification Search
    CPC .......... B29L 2031/06; B29C 45/14467; B29C
        45/14786; B29C 2045/14442; B60G
        7/001; B60G 2206/014; B60G 2206/016;
        B60G 2206/7104
    See application file for complete search history.

(56)         References Cited

U.S. PATENT DOCUMENTS

| | | | | |
|---|---|---|---|---|
| 5,374,780 | A | * | 12/1994 | Pazdirek ................. B29C 70/86 |
| | | | | 174/209 |
| 5,406,033 | A | * | 4/1995 | Pazdirek ............. H01B 17/325 |
| | | | | 174/209 |
| 6,116,113 | A | | 9/2000 | Pazdirek et al. |
| 11,104,196 | B2 | * | 8/2021 | Kwon ................. F16C 11/0633 |
| 2007/0264470 | A1 | | 11/2007 | Wellman |
| 2013/0105079 | A1 | * | 5/2013 | Masson ................... B29C 70/48 |
| | | | | 156/305 |
| 2015/0292550 | A1 | | 10/2015 | Streckel |
| 2022/0126639 | A1 | * | 4/2022 | Braun .................... B60G 7/005 |

FOREIGN PATENT DOCUMENTS

| | | | | |
|---|---|---|---|---|
| DE | 3204093 | A1 | 8/1983 | |
| DE | 102010015882 | A1 | 9/2011 | |
| EP | 3395591 | A1 * | 10/2018 | ............. B60G 7/001 |
| FI | 58966 | B * | 1/1981 | ............... F16C 9/04 |
| FR | 2529973 | A1 | 1/1984 | |
| FR | 3155457 | A1 * | 5/2025 | ............. B29B 11/16 |
| GB | 2123923 | A | 2/1984 | |
| JP | 2001214920 | A | 8/2001 | |
| JP | 2001515995 | A | 9/2001 | |
| JP | 2004243952 | A | 9/2004 | |
| JP | 2011126075 | A | 6/2011 | |

OTHER PUBLICATIONS

Machine translation of CN 106438667 A obtained on Jun. 24, 2025.*

Machine translation of FI 58966 B obtained on Jun. 24, 2025.*

International Search Report and Written Opinion dated Feb. 21, 2022 of International Application PCT/EP2022/050232 on which this application is based.

* cited by examiner

[Fig. 1]
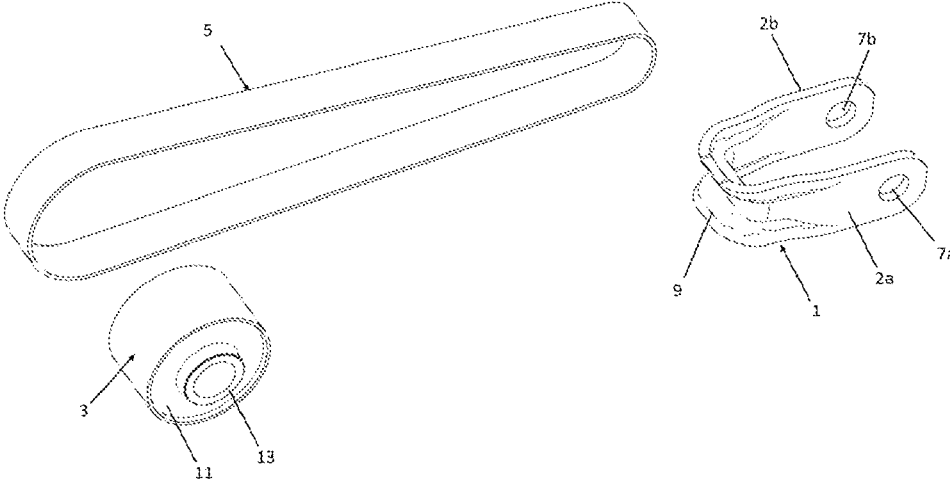
[Fig. 2]
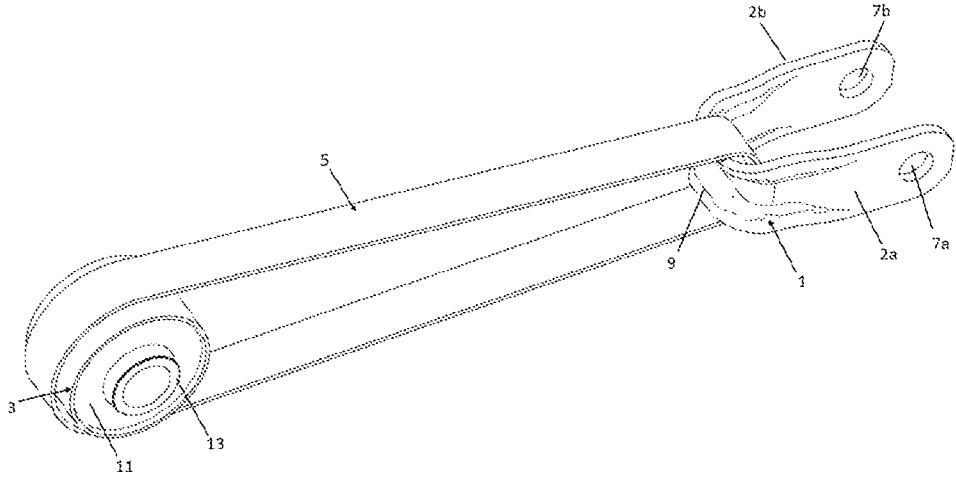
[Fig. 3]
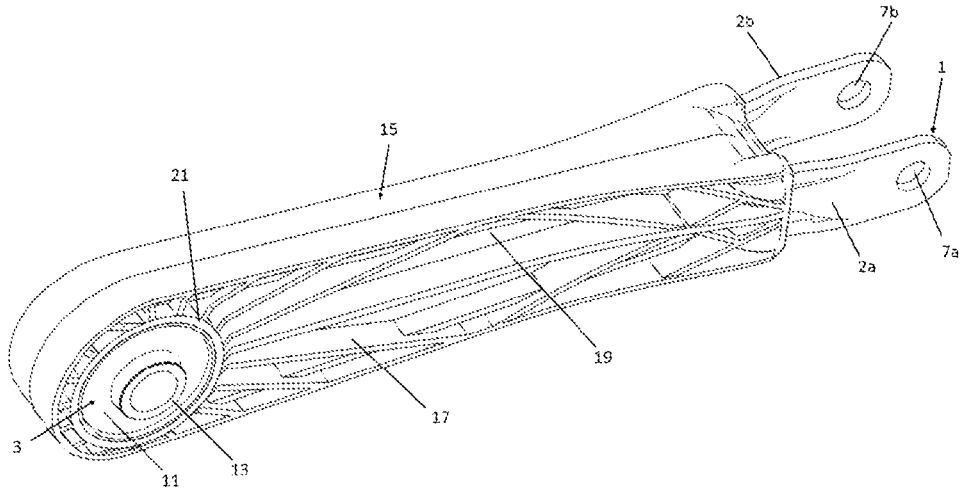

[Fig. 4]
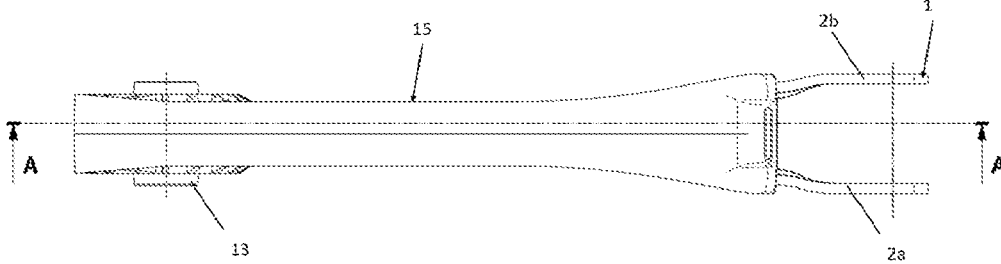
[Fig. 5]
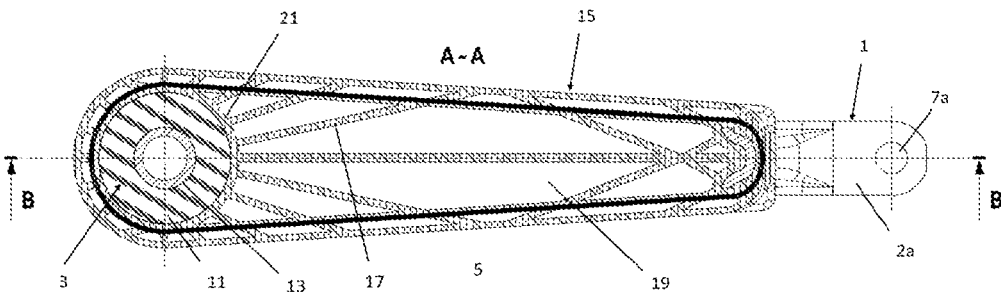
A~A
[Fig. 6]
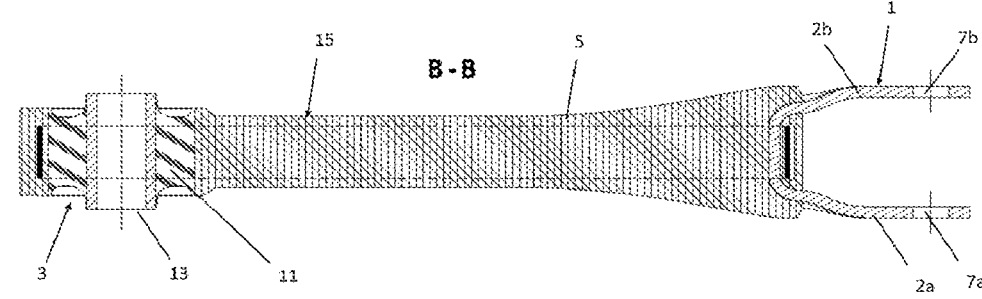
B-B
[Fig. 7]
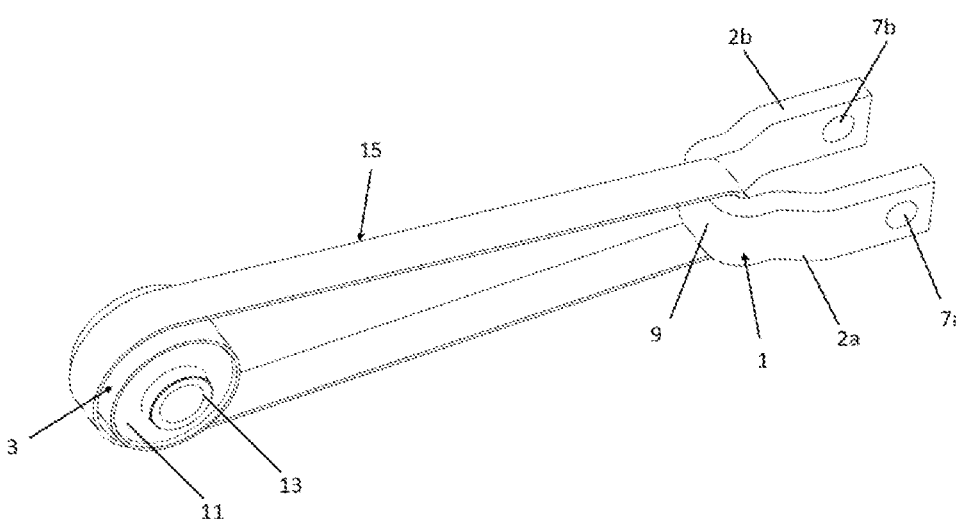

[Fig. 8]
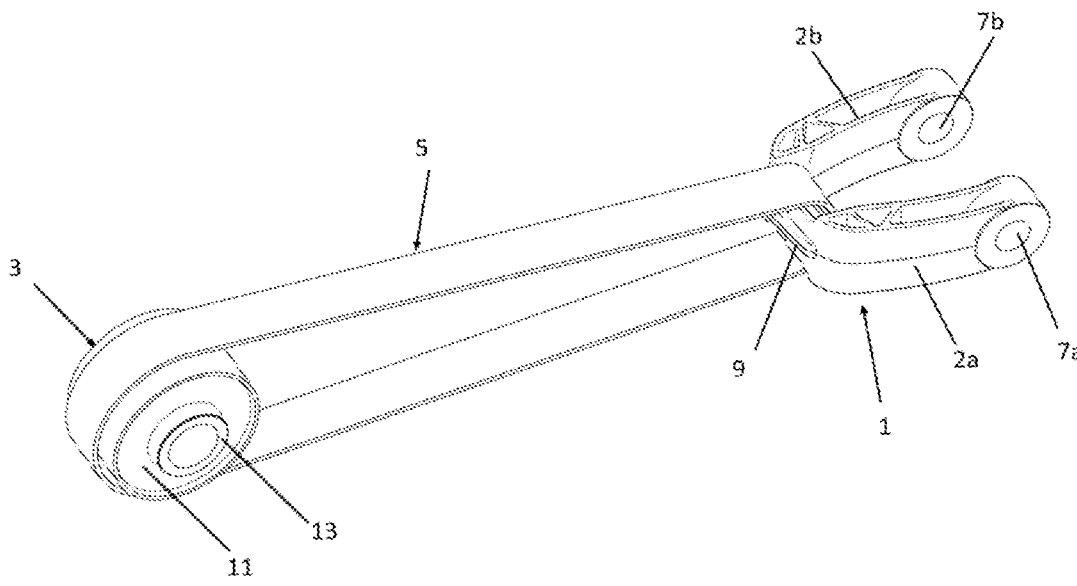
[Fig. 9]
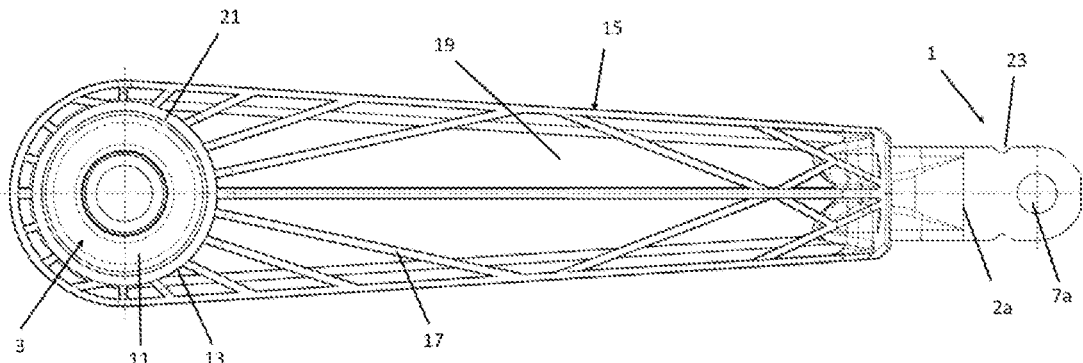
[Fig. 10]
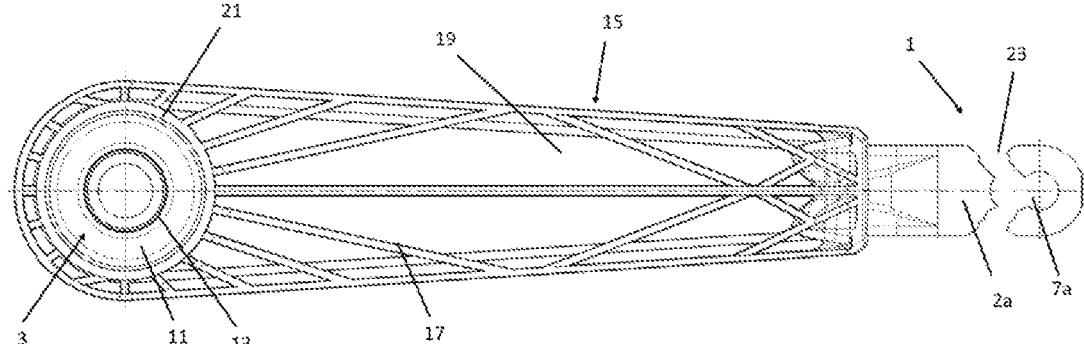

[Fig. 11]
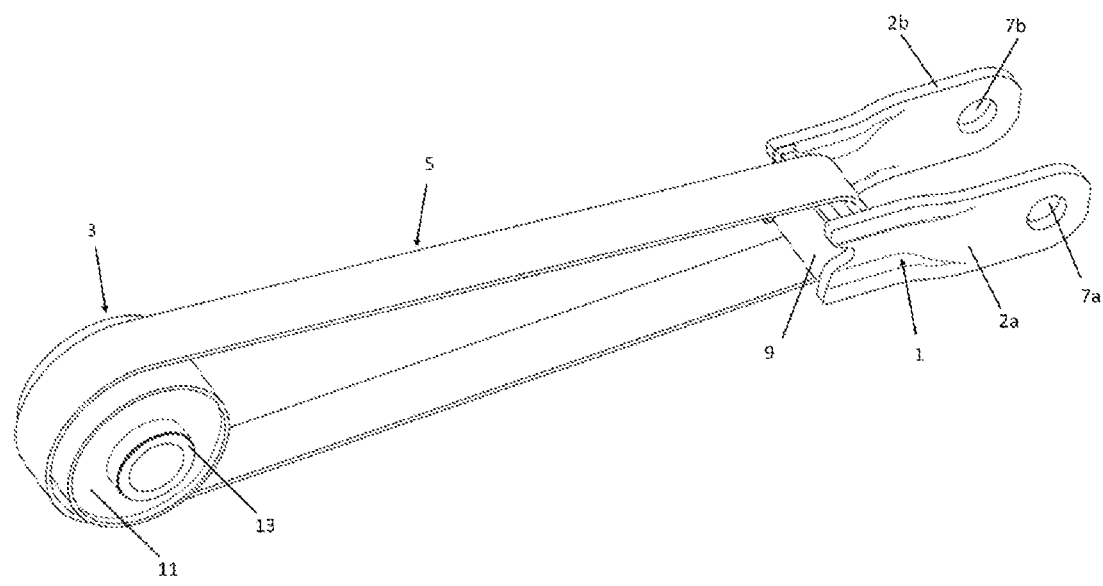

ROD FOR CONNECTING MEMBERS OF A MOTOR VEHICLE, AND ASSOCIATED MANUFACTURING METHOD

FIELD OF THE INVENTION

The present invention relates to the field of mechanics, and more specifically to that of the components involved in the structure of a motor vehicle.

TECHNICAL FIELD OF THE INVENTION

In a motor vehicle, certain members must be able to move relative to one another, along predetermined trajectories, while remaining firmly connected to one another.

To this end, connecting rods are provided: the ends of these connecting rods are rotatably mounted on each of the members capable of moving relative to one another along a predefined trajectory.

An example of such a connecting rod is a torque take-up connecting rod of the engine of a motor vehicle, interposed between this engine and the chassis of the vehicle.

Another example of such a connecting rod is a connecting rod between the cradle and a wheel support of a motor vehicle.

PRIOR ART

In certain applications, it is desirable to be able to use a connecting rod comprising, at one of its ends, a connecting eyelet and, at its other end, a connecting yoke.

This is the case, for example, for a cradle/wheel support connecting rod, the eyelet of which cooperates with the cradle, and the yoke with the wheel support.

Conventionally, these connecting rods of the prior art are formed from metal or a metal alloy, for example extruded aluminum, or cast steel.

The main drawback associated with these materials is their weight: they thus do not offer a satisfactory response when the motor vehicle manufacturer imposes strong constraints in particular on the weight of the constituent elements of the vehicle structure.

Also found in the prior art are connecting rods made of thermoplastic materials, of the type with eyelets at both ends, which are lighter but less mechanically strong.

Technical Problem to be Addressed

The object of the present invention is thus in particular to provide a connecting rod for a motor vehicle structure, of the connecting eyelet and yoke type, which is lighter than that of the prior art and which has at least equal mechanical strength.

DISCLOSURE OF THE INVENTION

This aim of the invention is achieved with a connecting rod comprising, at each of its two ends, a connecting part intended to cooperate with an external member, one of these connecting parts comprising a yoke and the other of these connecting parts comprising an eyelet, said yoke being connected to said eyelet by a continuous reinforcing strip forming a loop, said eyelet, said yoke and said strip being overmolded at least partially by a thermoplastic material.

With these features, a connecting rod is obtained which is not only strong, thanks to the presence of the continuous reinforcing strip, but also light, thanks to the use of a thermoplastic material, which replaces the metal or the metal alloy of the prior art.

According to other optional features of the connecting rod according to the invention, taken alone or in combination:

said yoke is formed from metal or from metal alloy, by stamping, or by casting, or by extrusion, and/or by machining and/or by welding a plurality of metal elements together: the use of metal or metal alloy makes it possible to ensure, by bolting, the good long-term stability of this end of the connecting rod which is intended to cooperate with a member of the motor vehicle, such as a wheel support member;

said yoke has an omega cross section in the zone of cooperation with said reinforcing strip: such a cross section makes it possible to guarantee an optimal distribution of the stresses in the yoke and in the other parts of the connecting rod; more specifically, this omega cross section makes it possible to obtain a high quadratic moment of the cross section while being stampable with small bending radii;

said yoke has zones of weakness, adapted to give way before the other parts of the connecting rod, in the event of forces exceeding a predetermined threshold: it is thus possible to provide for the connecting rod to be deformed in the part of the yoke, and not elsewhere, in the event of collision of the motor vehicle with an external obstacle, which makes it possible to control the mode of degradation of this connecting rod in an extreme situation;

said eyelet comprises an elastic element in the center of which is inserted a metal element of substantially tubular shape: this elastic element, which can be for example—but not necessarily—annular, makes it possible to filter the vibrations transmitted by the connecting rod, and the metal insert makes it possible to connect this elastic element by bolting to the structure of the motor vehicle without risk of wear of this element;

said reinforcing strip comprises long and continuous fibers such as glass or carbon fibers, or plant fibers such as flax or nettle fibers for example, embedded in a resin: such a reinforcing strip, produced for example—but in a nonlimiting manner—with a polyamide resin, has the advantage of being very resistant to tensile forces, while being flexible enough to be able to be easily implemented between the yoke and the eyelet during the process of manufacturing the connecting rod;

said thermoplastic overmolding is produced from a resin identical to or chemically compatible with that of the resin coating the fibers of said reinforcing strip: such overmolding can be easily carried out with conventional injection molding tools, at low cost; it also makes it possible to protect the reinforcing strip against projections of gravel and other particles during movement of the motor vehicle; as it is made from the same resin, or from a resin chemically compatible with that coating the reinforcing strip, excellent cohesion of this overmolding with the reinforcing strip is obtained;

said overmolding has cavities and ribs: these ribs and these cavities, placed on the main force paths, make it possible to save on overmolded material, and therefore to reduce the weight and the manufacturing cost of the connecting rod; in addition, ribs arranged between the reinforcing strip and the periphery of the connecting rod make it possible to position this reinforcing strip away from external mechanical attacks, such as impacts from gravel or other particles when the vehicle is moving.

The present invention also relates to a method for manufacturing a connecting rod in accordance with the above, wherein said reinforcing strip is passed inside said yoke and around said eyelet, these three thus connected parts are placed inside an injection mold, and an overmolding material is injected inside this mold.

In doing so, the overmolding material coats at least part of the yoke, the eyelet and the reinforcing strip, making it possible to secure these parts together.

When the eyelet comprises an annular elastic element, the pressure exerted by the overmolding material during its injection inside the mold makes it possible to compress this annular elastic element toward its center: this makes it possible to increase the service life of this elastic element.

BRIEF DESCRIPTION OF THE DRAWINGS

Other features and advantages of the invention will become apparent from reading the following description, with reference to the appended figures, in which:

FIG. 1: is a perspective view of a yoke, an eyelet and a reinforcing strip of a connecting rod according to the invention, before their assembly and their overmolding;

FIG. 2: is a perspective view of this yoke, this eyelet and this strip after their assembly and before their overmolding;

FIG. 3: is a perspective view of the connecting rod according to the invention after overmolding of the yoke, the eyelet and the reinforcing strip;

FIG. 4: is a top view of this connecting rod;

FIG. 5: is a sectional view of this connecting rod along the line A-A of FIG. 4;

FIG. 6: is a sectional view of this connecting rod along the line B-B of FIG. 5;

FIG. 7: is a view similar to that of FIG. 2, with a variant of the yoke;

FIG. 8: is a view similar to that of FIG. 2, with yet another yoke variant.

FIG. 9: is a view of the connecting rod of FIGS. 1 to 6, the yoke of which has a programmed zone of weakness, FIG. 10: is a view of this connecting rod after breakage of the yoke, and FIG. 11: is a perspective view similar to that of FIGS. 2, 7 and 8, with yet another yoke variant.

For greater clarity, identical or similar elements are denoted by identical or similar reference signs throughout the figures.

DETAILED DESCRIPTION OF EMBODIMENTS OF THE INVENTION

Reference is now made to FIG. 1, in which three parts are shown forming part of a connecting rod according to the present invention.

These three parts comprise a yoke 1, an eyelet 3, and a reinforcing strip 5.

The yoke 1 can be produced by stamping, by casting, by extrusion, by assembly of mechanically welded parts, from steel or any other metal alloy meeting the specifications imposed by the manufacturer.

The yoke 1 comprises an orifice 7a, 7b in each of its lateral branches 2a, 2b. The central part 9 of this yoke connecting the two lateral branches 2a, 2b together has an omega cross section, as can be seen for example in FIG. 5.

The eyelet 3 comprises a preferably—but in a nonlimiting manner—annular element 11 formed from an elastic material such as natural or synthetic rubber, overmolded with bonding onto a substantially tubular element 13, preferably formed from metal.

The reinforcing strip 5, the width of which can for example—but in a nonlimiting manner—be of the order of 20 mm, and the thickness of the order of 1 mm, is formed from resin, such as polyamide resin trapping long and continuous reinforcing fibers, such as glass or carbon fibers, or plant fibers such as flax or nettle fibers for example, these fibers being arranged substantially along the direction of the length of this strip 5.

The polyamide resin is given by way of example, but it goes without saying that other resins used in the field of composites can also be suitable.

This reinforcing strip 5 forms a continuous loop, that is to say it has no interruption.

As can be seen in FIG. 2, this reinforcing strip 5 is intended to pass around the annular rubber element 11 of the eyelet 3, and inside the yoke 1, around the central part 9 of this yoke, that is to say against the convex part of the omega cross section of this central part 9.

This particular cooperation of the reinforcing strip 5 with the yoke 1 and the eyelet 3 is also visible in FIG. 5.

FIGS. 3, 4, 5 and 6 show the connecting rod according to the invention after the overmolding operation with a thermoplastic material identical to or chemically compatible with the resin of the reinforcing strip 5, such as polyamide resin.

As can be seen in these figures, this thermoplastic material 15 coats the central part 9 of the yoke 1, the eyelet 3, and the reinforcing strip 5.

As is more particularly visible in FIGS. 3 and 5, this thus overmolded thermoplastic material comprises ribs 17 and cavities 19, judiciously placed with respect to the stress paths as they result from the design calculations.

Some of these ribs maintain a space between the reinforcing strip 5 and the periphery of the connecting rod, so as to protect this reinforcing strip from external attacks.

It will be noted in particular that a circular rib 21 surrounds the annular rubber element 11, and that thermoplastic material 15 completely coats the central part 9 of the yoke 1 having an omega cross section.

Preferably, the polyamide resin making it possible to obtain the overmolding 15 is itself filled with reinforcing fibers, for example glass or carbon fibers, or plant fibers such as flax or nettle fibers for example, preferably arranged along the length direction of the connecting rod.

To obtain the connecting rod according to the invention, the yoke 1, the eyelet 3 and the reinforcing strip 5, mutually arranged in accordance with FIG. 2, are placed inside an injection mold whose two half-molds comprise indentations corresponding to the negative of the overmolded plastics material 15 visible in FIGS. 3 and 5.

Once the three parts 1, 3 and 5 have been placed inside this mold, the polyamide resin is injected inside this mold, so that this resin circulates in all the recessed zones defining the ribs 17, 21.

The injection pressure makes it possible in particular to exert a radial compressive force on the annular rubber element 11, against the tubular metal element 13.

With this element 11 having previously been coated on its periphery with a special undercoat, it becomes completely bonded to the circular rib 21.

The overmolding thus obtained makes it possible in particular to protect the reinforcing strip 15 from projections of gravel or other particles, which may occur when the vehicle is moving.

This thus overmolded strip makes it possible to obtain excellent resistance of the connecting rod according to the invention with respect to tensile and compressive forces.

The radial compressive force produced on the elastic annular element 11 during the overmolding makes it possible to maintain this annular element under prestress, and thus to avoid premature wear of the rubber which constitutes it.

The omega profile of the central section 9 of the yoke 1 makes it possible to produce this yoke by stamping without risk of concentration of stresses in particular in the connecting parts of this central part with the branches 2a, 2b of this yoke.

It is possible to preferably provide certain predetermined zones of weakness in the yoke 1, so that in the event of a major impact, the connecting rod is degraded rather in the zone of the yoke 1 than elsewhere, which makes it possible to control the behavior of this connecting rod in an accident situation: such a zone of weakness 23 is shown by way of example in FIGS. 9 and 10, respectively before and after breakage of the yoke.

The two orifices 7a, 7b formed in the branches 2a, 2b of the yoke 1 are typically intended to cooperate with a motor vehicle wheel support eyelet.

The tubular element 13 of the eyelet 3 is typically intended to cooperate with a stud or more generally with a clevis secured to a motor vehicle axle cradle.

FIGS. 7 and 8, which are similar to FIG. 2, show two yoke variants: in FIG. 7, the yoke 1 is made of extruded aluminum, and in FIG. 8, the yoke 1 is ribbed and made of cast steel.

FIG. 11 shows a variant in which the yoke 1 is formed by mechanically welded assembly of a plurality of metal parts.

As can be understood in the light of the foregoing, the connecting rod according to the invention and its associated manufacturing method make it possible to obtain a strong connecting rod made of very light materials.

Such a connecting rod can be used for the joints of the wheels of a motor vehicle, but also, subject to the necessary geometric adaptations, for example as a torque take-up arm, interposed between the engine of a motor vehicle and its chassis.

Of course, the invention is described in the foregoing by way of example. It is understood that those skilled in the art are able to produce various variant embodiments of the invention without thereby departing from the scope of the invention.

The invention claimed is:

1. A connecting rod comprising:
   a connecting part intended to cooperate with an external member and located at an end;
   a second connecting part located at a second end;
   the second connecting part comprising a yoke;
   the connecting part comprising an eyelet;
   a reinforcing strip connected to the connecting part and the second connecting part, the reinforcing strip having a loop;
   the yoke and eyelet being overmolded by a thermoplastic material; and
   wherein the yoke comprises an omega cross section in a zone of cooperation with the reinforcing strip.

2. The connecting rod as claimed in claim 1, wherein the yoke is formed from metal by one of stamping, casting, extrusion, machining, and welding.

3. The connecting rod of claim 1, wherein the yoke has a zone of weakness adapted to give way before other parts of the connecting rod in the event of forces exceeding a threshold.

4. The connecting rod of claim 1, wherein the eyelet comprises an elastic element in a center of which is inserted a metal element of substantially tubular shape.

5. The connecting rod of claim 1, wherein the reinforcing strip comprises a plurality of continuous fibers based on one of glass, carbon fiber, plant fiber, flax, and nettle fibers.

6. The connecting rod of claim 5, wherein the thermoplastic overmolding is based on a thermoplastic resin.

7. The connecting rod of claim 5, wherein the connecting rod has a plurality of cavities and ribs.

8. The connecting rod of claim 1, wherein the yoke comprises first and second orifices in first and second lateral branches.

9. The connecting rod of claim 1, wherein the yoke is one of stamped, casted, and extruded.

10. The connecting rod of claim 1, wherein the yoke is formed from steel.

11. A method of manufacturing a connecting rod, the method comprising:
   passing a reinforcing strip inside a yoke and around an eyelet;
   placing the reinforcing strip, the yoke and the eyelet in an injection mold;
   injecting overmolding material inside the mold to form the connecting rod; and
   forming the yoke with an omega cross section in a zone of cooperation with the reinforcing strip.

\* \* \* \* \*